US007523499B2

(12) United States Patent
Wilkins et al.

(10) Patent No.: US 7,523,499 B2
(45) Date of Patent: Apr. 21, 2009

(54) SECURITY ATTACK DETECTION AND DEFENSE

(75) Inventors: Jonathan Wilkins, Seattle, WA (US); Gerard Gjonej, Redmond, WA (US); Adam Back, Devon (GB)

(73) Assignee: Microsoft Corporation, Redmond, WA (US)

( * ) Notice: Subject to any disclaimer, the term of this patent is extended or adjusted under 35 U.S.C. 154(b) by 742 days.

(21) Appl. No.: 10/809,111

(22) Filed: Mar. 25, 2004

(65) Prior Publication Data

US 2005/0216955 A1    Sep. 29, 2005

(51) Int. Cl.
*G06F 11/30* (2006.01)

(52) U.S. Cl. ................................ 726/23; 713/183

(58) Field of Classification Search ................. None
See application file for complete search history.

(56) References Cited

U.S. PATENT DOCUMENTS

| 5,278,901 | A | 1/1994 | Shieh et al. | |
|---|---|---|---|---|
| 6,587,032 | B2 | 7/2003 | Armingaud | |
| 6,647,400 | B1* | 11/2003 | Moran | 707/205 |
| 6,826,697 | B1* | 11/2004 | Moran | 726/23 |
| 6,996,843 | B1* | 2/2006 | Moran | 726/23 |
| 7,032,114 | B1* | 4/2006 | Moran | 713/187 |
| 7,086,089 | B2* | 8/2006 | Hrastar et al. | 726/22 |
| 7,203,962 | B1* | 4/2007 | Moran | 726/23 |
| 7,386,892 | B2* | 6/2008 | Gilfix et al. | 726/28 |
| 2002/0046275 | A1* | 4/2002 | Crosbie et al. | 709/224 |
| 2002/0108046 | A1 | 8/2002 | Armingaud | |
| 2002/0143963 | A1 | 10/2002 | Converse et al. | |
| 2003/0009693 | A1 | 1/2003 | Brock et al. | |
| 2003/0084320 | A1* | 5/2003 | Tarquini et al. | 713/200 |
| 2003/0084321 | A1* | 5/2003 | Tarquini et al. | 713/200 |
| 2003/0101359 | A1* | 5/2003 | Aschen et al. | 713/201 |
| 2003/0126596 | A1* | 7/2003 | Kim | 725/30 |
| 2003/0145224 | A1* | 7/2003 | Bailey | 713/201 |
| 2003/0145225 | A1 | 7/2003 | Bruton, III et al. | |
| 2003/0145226 | A1 | 7/2003 | Bruton, III et al. | |
| 2003/0233567 | A1* | 12/2003 | Lynn et al. | 713/200 |
| 2004/0059941 | A1* | 3/2004 | Hardman et al. | 713/201 |
| 2004/0117654 | A1* | 6/2004 | Feldman et al. | 713/201 |
| 2004/0255155 | A1* | 12/2004 | Stading | 713/201 |
| 2005/0015614 | A1* | 1/2005 | Gilfix et al. | 713/200 |

OTHER PUBLICATIONS

Barbara et al., "ADAM: A Testbed for Exploring the Use of Data Mining in Intrusion Detection," ACM Sigmod Record, Dec. 2001, pp. 15-24, vol. 30, Issue 4, ACM Press, New York, U.S.A.

Ding et al., "Undetectable On-Line Password Guessing Attacks," ACM SIGOPS Operating Review, Oct. 1995, pp. 77-86, vol. 29, Issue 4, ACM Press, New York, U.S.A.

\* cited by examiner

*Primary Examiner*—Christian LaForgia
(74) *Attorney, Agent, or Firm*—Senniger Powers LLP

(57) ABSTRACT

Detecting an attack on an authentication service. A first memory area is configured to store data relating to a plurality of requests communicated to an authentication service from a plurality of user agents. A second memory area is configured to store a predefined pattern of one or more requests. The predefined pattern characterizes an attack. A processor searches the stored data as a function of a query variable to identify at least one of the plurality of the requests communicated from at least one of the plurality of the user agents and compares the stored data associated with each of the identified requests with the predefined pattern to determine whether the identified request indicates the attack characterized by the predefined pattern. Other aspects of the invention are directed to computer-readable media for use with detecting the attack on the authentication service.

38 Claims, 6 Drawing Sheets

SECURITY ATTACK DETECTION AND DEFENSE

TECHNICAL FIELD

Embodiments of the present invention relate to the field of computer security. In particular, embodiments of this invention relate to detecting and defending against an attack on an authentication service.

BACKGROUND OF THE INVENTION

Presently available authentication services allow a user to maintain a user account and password for accessing information. For example, the user uses his or her user account and password to access a company intranet, a web server or service, or a private database. As users increasingly rely on authentication services to provide user validation functions, trust has become essential to the success of many of these authentication services. Trustworthiness is affected in part by the steps taken to improve the security of an authentication service. A key component in the security of the authentication service is the security of individual user accounts. If an attacker penetrates a single user account, the attacker has in effect defeated the authentication service, which causes loss of trustworthiness and confidence in the authentication service along with disclosure of confidential user information.

An authentication service may be subject to one or more types of attacks. For example, an attacker engaging in a brute force attack may target a large quantity of authentication credentials, thus increasing the probability that one of these authentication credentials would be successfully penetrated. In another example, an attacker engaging in an account-harvesting attack (or round robin attack) may try a small quantity of passwords on a large quantity of user accounts hoping that one of these passwords would be the valid password for a particular user account. Another type of attack is a denial of service (DoS) attack. Specifically, in a DoS attack, an attacker may fraudulently attempt to access several user accounts with an invalid password so that the authentication service would lock the attempted user accounts or take other preventive actions with the mistaken belief that these user accounts have been attacked. Any of the above attack types may also be distributed in that an attack may be initiated simultaneously from many locations and thus may be more serious as it is more difficult to detect.

Existing authentication services attempt to detect an attack by implementing an intrusion detection system. In general, an intrusion detection system may detect a hostile attack signature from a specific hostile source to generate an alarm and/or terminate communications from that specific hostile source. Nevertheless, an intrusion detection system often does not detect application-level events. Without providing the intrusion detection system with encryption keys, some authentication traffic may be not be detectable by the system, thus limiting its ability to report attacks.

Also, while an intrusion detection system may detect an attack in situations where a small quantity of user credentials is being targeted, it may not successfully detect an attack targeted against a large quantity of user credentials because it does not effectively detect attacks on these user credentials individually. That is, even though prior systems and methods may monitor a single user account to determine if an attack has occurred, they do not log and search authentication attempts communicating from a large quantity of user agents. As a result, prior systems and methods often may not effectively prevent an authentication service from being attacked if the authentication service maintains a large quantity of user credentials. Furthermore, an intrusion detection system often fails to identify what kind of authentication request pattern characterizes the one or more types of attacks.

Accordingly, a solution is needed that effectively detects and defends against an attack on an authentication service.

SUMMARY OF THE INVENTION

Embodiments of the invention overcome one or more deficiencies in the prior art by providing, among other things, a detection and defense mechanism against an attack on an authentication service. According to one embodiment, the invention advantageously defines patterns that characterize one or more types of attacks, including, but not limited to, brute force attacks, account-harvesting attacks, distributed attacks, and DoS attacks. Embodiments of the invention further advantageously log authentication data relating to a plurality of authentication requests communicated to the authentication service from a plurality of user agents. The authentication data includes, among other things, a network address from which an authentication request is communicated, an attempted user account and password associated with the communicated authentication request, and a status of the communicated authentication request. In one embodiment, the invention searches the logged authentication data as a function of one or more query variables to generate a result set that identifies a pattern characterizing the one or more types of attacks. Embodiments of the invention then provide a defense mechanism to remedy the characterized attacks. For example, one embodiment of the present invention advantageously locks a user account that has been attacked or blocks a network address from which an attack has been initiated. Moreover, the features of embodiments of the present invention described herein are economically feasible, commercially practical, and easier to implement than currently available techniques.

Briefly described, a method employing aspects of the invention detects an attack on an authentication service. The method includes storing data relating to a plurality of requests communicated to an authentication service from a plurality of user agents via a data communication network. The method also includes searching the stored data based on a query variable to identify at least one of the plurality of the requests communicated from at least one of the plurality of the user agents. The method further includes comparing the stored data associated with each of the identified requests with a predefined pattern characterizing an attack to determine when the identified request indicates the characterized attack on the authentication service.

In another embodiment of the invention, a system employing aspects of the invention detects an attack on an authentication service. The system includes a first memory area to store data relating to a plurality of requests communicated to an authentication service from a plurality of user agents via a data communication network. The data is stored in the first memory area as a log of the authentication service. The system also includes a second memory area to store a predefined pattern of one or more requests. The predefined pattern characterizes an attack on the authentication service. The system further includes a processor configured to execute computer-executable instructions to search the stored data as a function of a query variable to identify at least one of the plurality of the requests communicated from at least one of the plurality of the user agents. The processor is further configured to execute computer-executable instructions to compare the stored data associated with each of the identified requests with the predefined pattern and to determine whether the identified request indicates the attack characterized by the predefined pattern.

In yet another embodiment of the invention, a user authentication system includes a first memory area to store data relating to a plurality of requests communicated from a plurality of user agents. The user authentication system also includes a second memory area to store a predefined pattern of one or more requests, said predefined pattern characterizing an attack. The user authentication system further includes a processor configured to execute computer-executable instructions to search the stored data based on a query variable to generate a result set that identifies at least one of the plurality of the requests communicated from at least one of the plurality of the user agents. The processor is further configured to execute computer-executable instructions to compare each of the identified requests with the predefined pattern to determine if the characterized attack has occurred.

In further yet another embodiment of the invention, computer-readable media employing aspects of the invention have computer-executable components for detecting an attack on an authentication service. The computer-readable media include a memory component to store data relating to a plurality of requests communicated to an authentication service from a plurality of user agents via a data communication network. The computer-readable media also include a query component to search the stored data as a function of a query variable to identify at least one of the plurality of the requests communicated from at least one of the plurality of the user agents. The computer-readable media further include an analyzing component to compare the stored data associated with each of the identified requests with a predefined pattern characterizing an attack to determine when the identified request indicates the characterized attack on the authentication service.

Computer-readable media having computer-executable instructions for performing methods of detecting and defending against an attack on an authentication service embody further aspects of the invention.

Alternatively, embodiments of the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Exemplary Network Environment

Figure 1:
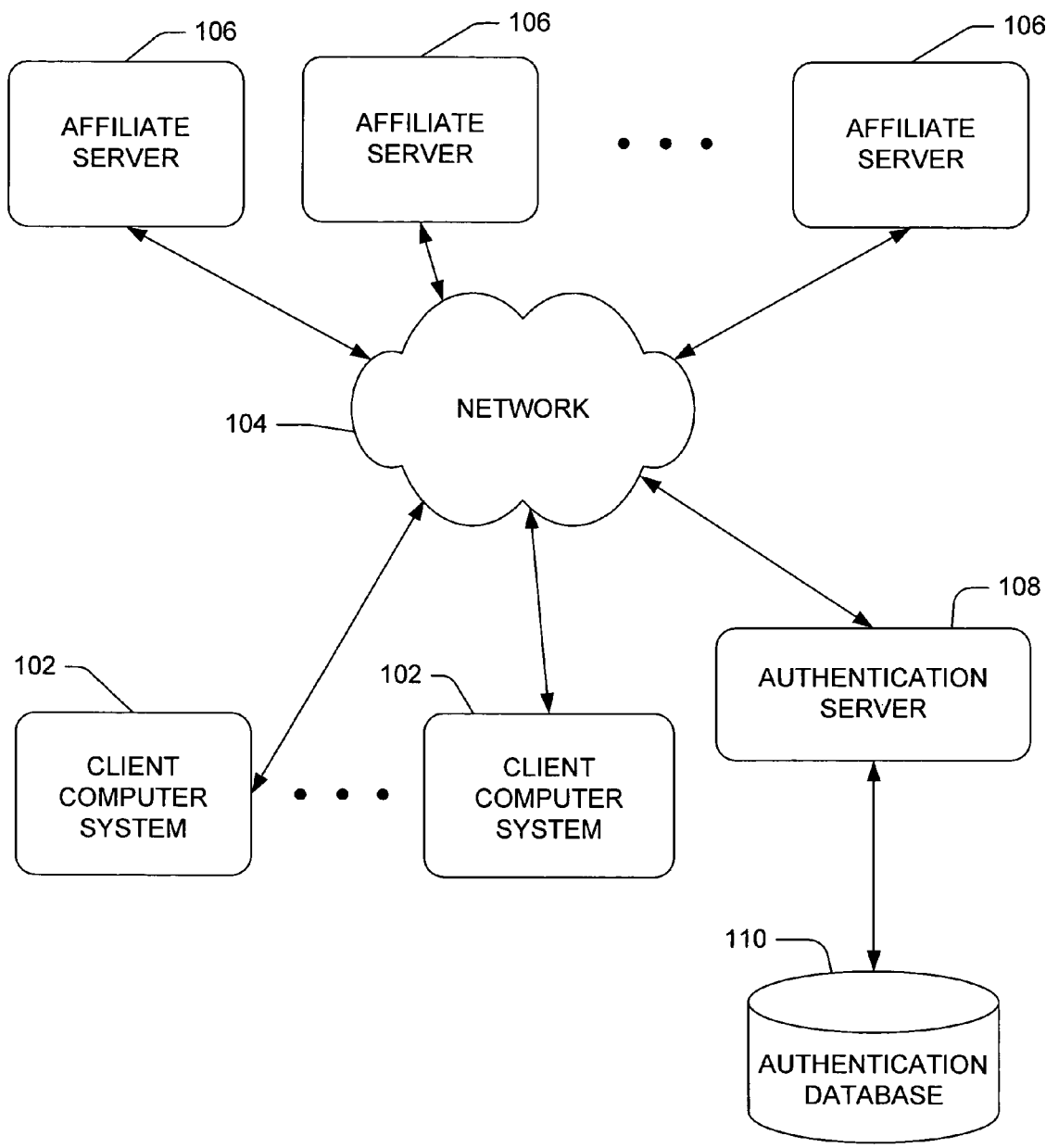
FIG. 1 is a block diagram illustrating an exemplary network environment in which embodiments of the present invention may be utilized.

Referring first to FIG. 1, a block diagram illustrates one example of a suitable network environment in which embodiments of the invention may be utilized. Embodiments of the invention relate to cross-network collaboration between web sites as part of a distributed, multi-site user authentication system. Such services provide a user with the ability to access one or more participating web sites or resources with a single sign-in.

According to one embodiment, the invention includes collecting authentication data from an authentication service. The authentication data relates to a plurality of authentication requests communicated to the authentication service to authenticate or validate one or more users of the authentication service. In an embodiment of the invention, the collected authentication data is then stored in a database or other memory area as a log of the authentication service. An operator may accordingly search the stored authentication data to identify an authentication request pattern that characterizes an attack on the authentication service.

In another embodiment, the invention includes defining one or more types of authentication request patterns. Specifically, an embodiment of the invention identifies which one or more elements of authentication data, when detected, would represent a pattern that characterizes an attack. An operator runs a query on the authentication data stored in the database, for instance, to determine if an authentication request pattern characterizing an attack exists in the stored authentication data. If such an authentication request pattern is identified by the query, then the operator or an automated defense mechanism may implement a mitigation action to remedy the identified attack.

Although the participating, or affiliate, sites still maintain control over permissions or authorizations, they use the authentication service rather than hosting and maintaining their own proprietary authentication systems. Although embodiments of the invention are described in terms of a multi-site user authentication system, the invention is operable with any type and quantity of authentication systems or services.

In FIG. 1, one or more client computer systems 102 are coupled to a data communication network 104. In this example, the network 104 is the Internet (e.g., supporting the World Wide Web). However, the teachings of the present invention can be applied to any data communication network. Multiple affiliate servers 106 are also coupled to network 104. In turn, the client computer systems 102 can access the affiliate servers 106 via network 104. Affiliate servers 106 are also referred to as web servers or network servers.

FIG. 1 further shows an authentication server 108 also coupled to network 104. Also shown in FIG. 1, an authentication database 110 is associated with the authentication server 108. Although the authentication database 110 is shown separately from the authentication server 108, it is to be understood that in other embodiments of the invention, authentication database 110 is included within authentication server 108. Moreover, in a federated environment, for example, a plurality of authentication servers 108 may be used to provide an authentication service.

In one embodiment of the invention, a user of one of the client computer systems 102 registers and maintains a user account with authentication server 108, and authentication database 110 stores a user credential to authenticate the registered user (as well as other users on the network). A user credential is a means for generating an authenticated reference for a single account identifier. Specifically, a user credential includes a login identifier (login ID), which may be a common login ID used to access any affiliate server (e.g., affiliate server 106), and a password associated with the login ID and used for authentication purpose. For example, an EASI (E-mail As Sign-In) sign-in name and password, a mobile phone number and PIN, and a biometric signature are user credentials that can be associated with a particular user.

Authentication database 110 also stores user-specific information associated with the registered user. In one example, the stored user-specific information includes the user's electronic mail address, first and last name, citizenship, gender, birth date, occupation, telephone number(s), credit card information, billing and shipping addresses, password, personal identification number (PIN), and the like. Such user-specific information is provided to a particular affiliate server 166 when the registered user accesses its service.

As can be seen, protecting the integrity of a user account associated with a user of client computer system 102 and maintained by authentication server 108 may be essential to establish reliability of the authentication service provided by server 108. For instance, if an attacker compromises a user account, he or she may pose as the user to access one or more services provided by affiliate servers 106. Worse, the attacker may be able to access confidential information regarding the user and may wrongfully obtain the confidential information for use in illegal activities (e.g., identity theft).

Attack Detection and Remediation

Figure 2:
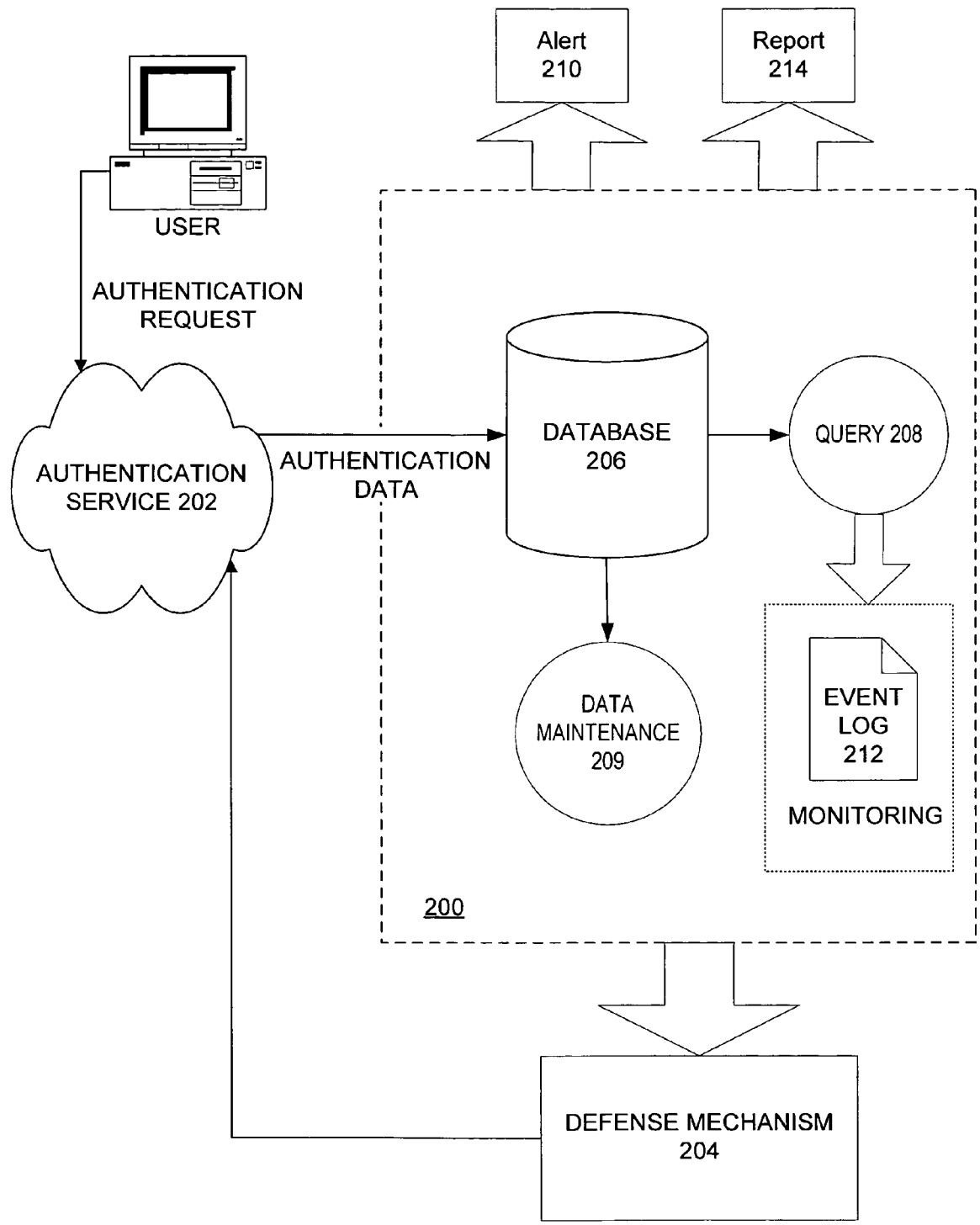
FIG. 2 is a block diagram illustrating an exemplary system for detecting and remedying an attack on an authentication service according to one embodiment of the invention.

FIG. 2 shows an exemplary system 200 according to one embodiment of the invention. The exemplary embodiment of the system 200 is adapted to detect an attack on an authentication service 202 and to report and alert a defense mechanism 204 of the detected attack to engage in a mitigation action that would remedy the attack. According to one embodiment of the invention, the authentication service 202 is a multi-site user authentication service that allows a user to sign in to multiple, affiliated sites using a single user account. Embodiments of the present invention effectively help to prevent stored user-specific information from being compromised by an attack. Embodiments of the present invention further prevent an attacker from controlling a user account to access one or more affiliated sites. In one embodiment, the invention also advantageously identifies a DoS attack against one or more user accounts that may deny valid users of these accounts from being authenticated by authentication service 202.

In an alternative embodiment of the invention, authentication service 202 is an authentication service that authenticates a user of a private or public network. For example, authentication service 202 authenticates and signs in a user to a company intranet. In such a scenario, preventing an attack may be important because an attacker may be able to access and misappropriate confidential information regarding the company if authentication service 202 is compromised. Alternatively, authentication service 202 authenticates a user for access to a database system or to any other systems that desire to protect their internal information.

FIG. 2 also shows that authentication data relating to one or more authentication requests communicated to authentication service 202 is collected and logged into a memory area such as a database 206 designed for the purpose of running a query 208 (e.g., a structured query language (SQL) query) to detect an attack. In one embodiment, logging the authentication data into database 206 is a separate process from the user sign-in or authentication process. And an authentication server providing authentication service 202 and a registration server providing a registration service both communicate with database 206 to log data into database 206. In another embodiment of the invention, the database 206 may be inactivated for maintenance, and thus authentication data will not be logged into database 206 during this period. But if an authentication server providing authentication service 202 is experiencing an overload, it is desired to keep database 206 active, since the overload may be caused by an attack on authentication service 202.

The authentication data logged and stored in database 206 allows embodiments of the invention to identify an attack targeted against authentication service 202. According to one embodiment of the invention, the logged authentication data includes a network address (e.g., an internet protocol (IP) address) from which an authenticated request is communicated. The logged authentication data also includes a credential type of the communicated authentication request. For example, the credential may be generic, password-based, or certificate-based. An attempt by the communicated authentication request to access the user account is logged into database 206. And the logged authentication data further includes a password attempted by the communicated authentication request to access this user account. In one embodiment of the invention, if the attempted user account does not exist in authentication service 202, then authentication service 202 logs a name string attempted by the communicated authentication request into database 206. Moreover, in another embodiment of the invention, if authentication service 202 successfully validates the communicated authentication request, then authentication service 202 will not log the password associated with the successful authentication request to protect the user credentials.

Database 206 further stores a status of the communicated authentication request, which indicates whether the communicated authentication request has been successfully validated by authentication service 202 or if the communicated authentication request results in a user account being locked by authentication service 202. And a time stamp indicating a date and time of the communicated authentication request is logged into database 206. Also, the authentication data includes a login interface from which the authentication request is communicated as well as a user agent of the communicated authentication request if the login interface is a web-based interface.

In one embodiment of the invention, the authentication request may be communicated to authentication service 202 via a human interaction proof (HIP). For example, the HIP implemented on an interface requests a user to type in characters from a picture to register or authenticate the user. Implementing an HIP on a registration or authentication interface may be important because an attacker may use an automated software program to try to register or sign in a large quantity of user accounts with authentication service 202. This attacker can then use these user accounts to cause problems for other users, such as sending junk electronic mail messages or slowing down authentication service 202 by signing into multiple user accounts simultaneously. Since in most cases, an automated software program cannot easily recognize characters in a picture, implementing a HIP may ensure that a person, not an automated software program, is completing a registration or authentication interface. Further, implementing a HIP may be a potential mitigation action to remedy attacks on credentials. If a given network address is communicating many authentication attempts, further attempts from that network address may be requested to provide a solution to the HIP challenge, thus increasing the cost to an attacker. Accordingly, if a request is communicated to authentication service 202 via a HIP, the logged data further includes a process or interface where the HIP is implemented. For example, the HIP may be implemented on a sign-in (authentication), password-reset, or registration process or interface. By logging data relating to a HIP system, it may be determined if the HIP system is not working properly or if there is an attack on the HIP system.

The authentication data stored in database 206 in one embodiment includes personally identifiable information or is otherwise privacy and security sensitive. This is because an attacker may utilize the stored data to engage in future attacks that could further damage authentication service 202. Accordingly, in one embodiment, database 206 is subject to the same security constraints as an authentication database (such as authentication database 110). In other words, third parties are not able to access or run a query on the authentication data stored in database 206. Furthermore, to protect the integrity of database 206, the stored authentication data undergoes a data maintenance process 209 periodically. For example, authentication data that has been stored in database 206 for longer than a certain period (e.g., seven days) is deleted from database 206. And if a user chooses to close his or her user account, then authentication data relating to that user account is deleted from database 206.

To detect and prevent various attacks on authentication service 202, it is desirable to classify these attacks and determine their damage potentials. And it is desirable to define authentication request patterns that characterize these attacks and to determine the analysis to identify these attacks from available authentication data, as described below. These predefined authentication request patterns are then stored in database 206 or in a second memory area or database for future access. After the types of attacks have been defined, an operator specifies a particular type of attack that he or she desires to detect and runs the query 208 to search the stored authentication data and to determine if the particular type of attack has occurred. Particularly, query 208 is configured or tuned with one or more query variables representative of various activities on a typical authentication service to search for specific elements of the stored authentication data. If these elements have values that correspond to a predefined authentication request pattern, then query 208 determines that an attack type characterized by the predefined authentication request pattern has occurred.

TABLE 1 summarizes various exemplary types of attacks, their attack elements, and intentions. These types of attacks are further discussed below, in decreasing order of detection priority (as defined by the probability and the severity of an attack) according to one embodiment of the invention. In these attack types, the exemplary base query variables to identify the authentication request patterns include one or more of the following: a network address that communicates an authentication request (which may be used as the identifier of an attacker), a quantity of user accounts for which access has been attempted, a password associated with a failed authentication request, a quantity of failed authentication requests for one or more user accounts, a quantity of authentication requests for one or more user accounts, and a time interval during which one or more authentication requests are communicated. In one embodiment of the invention, system 200 includes query 208 and/or other computer-executable instructions that constitute means for determining if the authentication data associated with one or more authentication requests communicated to authentication service 202 matches a pattern that characterizes one or more of the types of attacks shown in TABLE 1. In another embodiment, query 208 and/or other computer-executable instructions constitute means for determining if one or more identified authentication requests indicate the types of attacks shown in TABLE 1. But it is noted that embodiments of the invention contemplate detecting other types of attacks as well.

TABLE 1

Types of Attacks

| Attack Type | Attack Elements | Attack Intention | Attack Explanation |
|---|---|---|---|
| A | Multiple network addresses Multiple User Accounts Single Password | To obtain passwords of a group of users using a distributed attack with a commonly used password (i.e., distributed password sweep). | A frenzy of failures (multiple user accounts getting failed authentication requests from multiple network addresses). |
| B | Single network address Multiple User Accounts Single Password | To obtain passwords of a group of users using a commonly used password (i.e., password sweep). | Network address I has Y failed authentication requests for multiple user accounts using a single password P. |
| C | Single network address Multiple User Accounts Multiple Passwords | 1. To obtain passwords of a group of users using a dictionary attack. 2. To cause the authentication service to engage in a preventive action for a group of user accounts (e.g., locking the accounts). | Network address I has Y failed authentication requests for multiple user accounts. |

TABLE 1-continued

Types of Attacks

| Attack Type | Attack Elements | Attack Intention | Attack Explanation |
|---|---|---|---|
| D | Multiple network addresses Single User Account Multiple Passwords | 1. To obtain a specific user's password using a distributed online dictionary attack. 2. To cause the authentication service to engage in a preventive action for a specific user account (e.g., locking the account). | User Account X has Y failed authentication requests in Z minutes from more than one network addresses. |
| E | Single network address Single User Account Multiple Passwords | 1. To obtain a specific user's password using an online dictionary attack. 2. To cause the authentication service to engage in a preventive action for a specific user account (e.g., locking the account). | User Account X has Y failed authentication requests from network address I within Z minutes. |
| F | Multiple network addresses Single User Account Single Password | To cause the authentication service to engage in a preventive action for a specific user account (e.g., locking the account). | User Account X has Y failed authentication requests in Z minutes from more than one network addresses and using a single Password P. |
| G | Single network address Single User Account Single Password | To cause the authentication service to engage in a preventive action for a specific user account (e.g., locking the account). | User Account X has Y failed authentication requests from network address I within Z minutes using password P |
| H | Multiple network addresses Multiple User Accounts Multiple Passwords | To obtain passwords of a group of users using a distributed online dictionary attack. | A frenzy of failures (multiple failed authentication requests on multiple user accounts from multiple network addresses). |

In attack type A, multiple network addresses, multiple user accounts, and a single password characterize the attack. This attack type has the highest priority in that it may be highly probable and severest to authentication service 202 because no other means of detection is generally available. Generally, this attack type involves attempting to sign in multiple user accounts using a single password and multiple network addresses. In other words, this attack type may be a distributed account-attack. Because of the attack, a user with a vulnerable password may lose control of his or her user account.

To determine if this attack type has occurred, query 208 is configured with one or more query variables to search for a quantity of failed authentication requests from multiple network addresses that use the same password to sign in multiple user accounts within a predefined time interval, with the quantity of failed authentication requests greater than a predetermined quantity. For example, the predetermined quantity may be ten and the predefined time interval may be the last five minutes so that query 208 may search for an authentication request pattern characterized by more than ten failed authentication requests that use multiple network addresses and the same password to sign in multiple user accounts within the last five minutes. Thus, query 208 will generate a result set that identifies the password, the quantity of attempted user accounts, the quantity of network addresses, the network addresses that communicated the failed requests, and the time interval. In one embodiment of the invention, the quantity of network addresses or the quantity of attempted user accounts is not a factor in identifying this authentication request pattern. That is, according to an embodiment of the invention, the result set excludes the quantity of network addresses and the quantity of attempted user accounts.

In attack type B, a single network address, multiple user accounts, and a single password characterize the attack. In this attack type, a single network address uses the same password to try to sign in multiple user accounts. Since this attack type uses a single network address, it is a non-distributed account-harvesting attack. As a result of the attack, a user with a vulnerable password may lose control of his or her user account. To determine if this attack type has occurred, query 208 is configured with one or more query variables to search for a quantity of failed authentication requests from a single network address that uses the same password to sign in multiple user accounts within a predefined time interval, with the quantity of failed authentication requests greater than a predetermined quantity. Thus, query 208 will generate a result set that identifies the password, the quantity of attempted user accounts, the quantity of network addresses (which is one in this case), the network address that communicated the failed requests, and the time interval. In one embodiment of the invention, the quantity of attempted user accounts is not a factor in identifying this authentication request pattern, and accordingly it is excluded from the result set.

Even if this authentication request pattern is detected by query 208, it may not signify an attack but instead may indicate that multiple users are attempting to sign in their user accounts using the same mistaken password and via a proxy, which is a computer or software that provides a single network address for internal users of a network. But it may also be the case where an attacker is hiding behind the proxy to attack authentication service 202. Accordingly, the proportion between the quantity of failed authentication requests and the quantity of successful authentication requests is analyzed to determine if an attack has occurred. If the quantity of failed authentication requests exceeds the quantity of successful authentication requests, then it is likely that an attack has occurred.

In attack type C, a single network address, multiple user accounts, and multiple passwords characterize the attack. This attack type involves an authentication request pattern of multiple failed authentication requests for a single network address. In other words, this pattern may indicate a brute force attack on multiple user accounts. But since a single network address is involved, this pattern is not a distributed attack. Because of the attack, a user may lose control of his or her user account. To determine this attack type, query 208 is configured with query variables to search for a quantity of failed authentication requests from a single network address that uses multiple passwords to sign in multiple user accounts within a predefined time interval, with the quantity of failed authentication requests greater than a predetermined quantity. Accordingly, query 208 may generate a result set that identifies the quantity of network addresses (which is one in this case), the network address that communicated the failed requests, the quantity of failed authentication requests, and the time interval. But according to one embodiment of the invention, the quantity of attempted user accounts or the quantity of attempted passwords is a non-factor in identifying this authentication request pattern. Also, this authentication request pattern may correspond to a proxy where users are making mistakes in signing in their own user accounts. It may also be the case where an attacker is hiding behind the proxy to attack authentication service 202. Accordingly, the proportion between the quantity of failed authentication requests and the quantity of successful authentication requests is analyzed to determine if an attack has occurred.

In attack type D, multiple network addresses, a single user account, and multiple passwords characterize the attack. This attack pattern involves an authentication request pattern of a single user account having multiple authentication requests with multiple attempted passwords. A user may lose control of his or her user account because of the attack. If multiple network addresses are involved, then this attack type characterizes a distributed brute force attack. To determine if this attack type has occurred, query 208 is configured with query variables to search for a quantity of failed authentication requests from one or more network addresses that that use multiple passwords to sign in a single user account within a predefined time interval, with the quantity of failed authentication requests greater than a predetermined quantity. Accordingly, the result set generated by query 208 will identify the attempted user account, the attempted passwords, the quantity of network addresses, the network addresses that communicated the failed requests, and the time interval. In one embodiment of the invention, the quantity of network addresses is not a factor in determining this pattern and is not identified in the result set. Moreover, even if this authentication request pattern is detected, it may still involve valid authentication requests to access a user account that has multiple users.

In attack type E, a single network address, a single user account, and multiple passwords characterize the attack. In this attack type, a single network address uses multiple passwords to attempt to sign in a single user account. But in one embodiment of the invention, the quantity of attempted passwords is not a factor in identifying this attack type. Since a single network address is used to attack authentication service 202, this attack type is a non-distributed brute force attack on a single user account. A user may lose control of his or her user account as a result of the attack. To determine if this attack type has occurred, query 208 is configured with one or more query variables to search for a quantity of failed authentication requests from a single network address that uses multiple passwords to sign in a single user account within a predefined time interval, with the quantity of failed authentication requests greater than a predetermined quantity. But if the quantity of failed authentication requests is below a threshold level, this authentication request pattern may involve a user who has communicated multiple authentication requests with multiple mistaken passwords. The result set generated by query 208 will identify the attempted user account, the attempted passwords, the quantity of network addresses (which is one in this case), the network address that communicated the failed requests, and the time interval.

In attack type F, multiple network addresses, a single user account, and a single password characterize the attack. In this attack type, multiple network addresses attempt to sign in the same user account using the same password. Accordingly, a user may be locked out of his or her user account. Since multiple network addresses are used, this pattern may involve a distributed DoS attack or broken tool. But it may also be the case where a bug exists within authentication service 202. To determine if this attack type has occurred, query 208 is configured with query variables to search for a quantity of failed authentication requests from multiple network addresses that use a single password to sign in a single user account, with the quantity of failed authentication requests greater than a predetermined quantity. Accordingly, query 108 will generate a result set that identifies the attempted user account, the attempted password, the quantity of network addresses, and the network addresses that communicated the failed requests.

In attack type G, a single network address, a single user account, and a single password characterize the attack. This attack type involves an authentication request pattern of a single user account having multiple failed authentication requests. As a result, a user may be locked out of his or her user account. In one embodiment of the invention, the quantity of attempted passwords or the quantity of network addresses is a non-factor in identifying this authentication request pattern. To determine if this attack type has occurred, query 208 is configured with at least one query variable to search for a quantity of failed authentication requests that use a single password to sign in a single user account within a predefined time interval, with the quantity of failed authentication requests greater than a predetermined quantity. Accordingly, query 208 will generate a result set that identifies the attempted user account, the attempted password, the network address that communicated the failed requests, and the time interval. Also, even if this authentication request pattern is detected, it may be the case where users are making mistakes in signing in their own user accounts via a proxy. But it may also be the case where a bug exists within authentication service 202.

In attack type H, multiple network addresses, multiple user accounts, and multiple passwords characterize the attack. This attack type involves an authentication request pattern of using multiple network addresses and multiple passwords to access multiple user accounts. Accordingly, a user may lose control of his or her user account. Since multiple network addresses are used, this attack type is a distributed attack. To determine if this attack type has occurred, query 208 is configured with one or more query variables to search for a quantity of failed authentication requests from multiple network addresses that use multiple passwords to sign in multiple user accounts within a predefined time interval, with the quantity of failed authentication requests greater than a predetermined quantity. As such, the result set generated by query 208 will identify the quantity of attempted passwords, the quantity of attempted user accounts, the quantity of network addresses, the network addresses that communicated the failed requests, and the time interval. Since during a particular period, multiple users from various network addresses may attempt to use mistaken passwords to sign in their own user accounts, instances of attacks with this authentication request pattern may be rare.

As discussed above, a particular request (e.g., an authentication, registration, or password-reset request) may be communicated with a HIP. If this is the case, an attacker may attempt to attack the HIP system to breach authentication service 202. Accordingly, a request to the HIP system may involve a HIP response pattern, which indicates a type of attack on the HIP system (e.g., brute forcing a HIP solution). But since authentication service 202 is already shielded, at least partly, by the HIP, such a HIP response pattern has a lower detection priority than if the HIP is not implemented for authentication service 202. In general, in a first HIP response pattern, an attacker using an automated software program may attempt to guess a particular HIP string multiple times. Accordingly, to detect this HIP response pattern, query 208 is configured with query variables to search for a quantity of failed authentication requests to sign in a user account via the same HIP string and within a predefined time interval, with the quantity of failed authentication requests greater than a predetermined quantity. And the result set generated by query 208 will identify the HIP string, the network address that communicated the failed requests, and the time interval.

In a second HIP response pattern, an attacker may use the same test string to attempt on multiple, different HIP strings. So to detect this HIP response pattern, query 208 is configured with query variables to search for a quantity of failed authentication requests that use the same test string to sign in one or more user account within a predefined time interval, with the quantity of failed authentication requests greater than a predetermined quantity. Therefore, query 208 will generate a result set that identifies the attempted test string, the network address that communicated the failed requests, and the time interval.

After the authentication data is logged into database 206 and is ready for analysis, an automated process moves the logged authentication data out of database 206 for access by an operator. As discussed, the operator then runs query 208 on the authentication data (which may be live authentication data presently being communicated to authentication service 202) to determine if the authentication data includes a pattern that matches one or more of the predefined authentication request patterns discussed above. Specifically, query 208 is configured with one or more query variables based on a particular attack type desired to be detected and searches the authentication data to identify one or more authentication requests as a function of at least one of the query variables. Query 208 then compares the authentication data associated with the identified authentication request with one or more predefined patterns to determine if the identified authentication request indicates one or more attacks characterized by the predefined patterns. Specifically, query 208 may determine whether the authentication data associated with the identified authentication request matches one or more predefined patterns that query 108 desires to detect.

In an alternative embodiment of the invention, query 208 or other operations may compare historical authentication data to current authentication data (e.g., comparing historical average quantity of failed authentication requests with the current quantity of failed authentication requests) and may determine that there is a suspicious activity if the current authentication data deviates from the historical authentication data. If query 208 determines that the identified authentication requests indicate an attack on authentication service 202 or otherwise determines that there is a suspicious activity, then system 200 generates an alert 210 to inform the operator that an attack against authentication service 202 may have occurred. The alert 210 flags one or more network addresses that seem to participate in the suspicious activity. The operator then screens the flagged network addresses to determine if anyone of them is a proxy (e.g., by referring to a list of mega-proxies). As discussed, for some proxies, occurrences of such an authentication request pattern may be a normal behavior. If the operator suspects that it may be the case where an attacker is hiding behind the proxy to attack authentication service 202, he or she analyzes the proportion between the quantity of failed authentication requests and the quantity of successful authentication requests to decide if an attack has occurred. After it is decided that an attack has occurred, system 200 implements the defense mechanism 204 to remedy the attack.

Depending on the severity or potential consequences of the attack, defense mechanism 204 is implemented on authentication service 202 manually or automatically to engage in one or more mitigation actions that remedy the attack. For example, defense mechanism 204 shields a user account from being accessed by a particular network address, at least temporarily. Defense mechanism 204 also blocks the flagged network addresses from communicating with authentication service 202. Defense mechanism 204 may further implement one or more HIPs on a registration, sign-in/authentication, and password-reset processes or interfaces to prevent an attacker from using an automated software program to attack authentication service 202. To prevent future attacks on authentication service 202, defense mechanism 204 may prompt a user whose user account has been attacked to change his or her password. Furthermore, defense mechanism 204 may prompt one or more users having certain "weak" passwords (i.e., passwords that are commonly known) to change their passwords. Also, defense mechanism 204 may limit a quantity of failed authentication requests communicated within a time interval (e.g., ten failed authentication requests per second) and from a particular network address. Defense mechanism 204 may also engage in combinations of the described actions to provide an enhanced solution to remedy and prevent the attack.

According to one embodiment of the invention, an operator monitors query 208 via an event log 212 to examine activities of authentication service 202. In particular, event log 212 includes information relating to activities of system 200 (including authentication service 202) during a specific period. Thus, an audit entry in an audit trail is recorded in even log 212 when certain events occur (e.g., when an attack is detected). In another embodiment of the invention, query 208 is run on authentication data automatically and periodically (e.g., once a day) in order of the detection priority so it may timely detect an attack.

Regardless of whether an attack has been detected, query 208 generates a report 214 to summarize the stored authentication data as well as activities of authentication service 202. If one or more attacks have been detected, the report 214 prioritizes the attacks and provides detailed information regarding the attacks, such as a date and time of the attacks, a network address that initiated the attacks, the attacked user accounts, etc. Report 214 thus provides a result of query 208 and includes the same information for query 208 to detect the attacks. Also, in one embodiment of the invention, report 214 is in text format so that it may be easily converted to other formats in the future. In another embodiment of the invention, report 214 discloses a summary of intrusion attempts made on authentication service 202 over a certain period. In an embodiment, report 214 also provides the extent to which security of authentication service 202 has improved over this period. And report 214 may indicate implications of security for a particular version or release of authentication service 202, which may be attributed to the launch of some defensive features such as HIP.

APPENDIX A provides specific examples of user scenarios according to embodiments of the invention.

Exemplary Attack Detection Method

Figure 3:
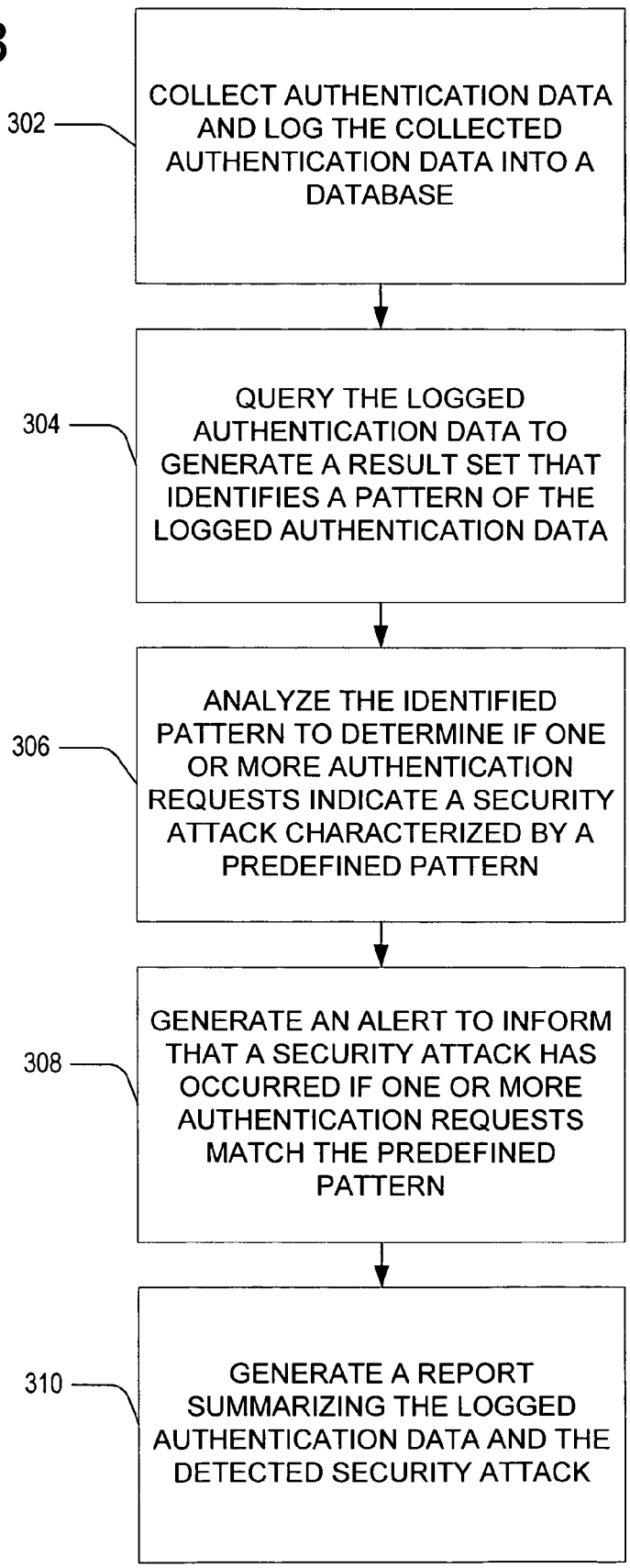
FIG. 3 is an exemplary flow diagram illustrating process flow according to one embodiment of the invention for detecting an attack on an authentication service.

FIG. 3 generally illustrates one exemplary method for detecting an attack on an authentication service according to one embodiment of the invention. At 302, authentication data relating to one or more authentication requests communicated to the authentication service is collected and logged into a database. At 304, the logged authentication data is queried, for example, by a data-modeling tool, and a result set of the queried authentication data is generated. The result set identifies the logged authentication data of one or more authentication requests that correspond to at least one query variable. That is, a query configured with one or more query variables is run on the logged authentication data to determine if a pattern of the logged authentication data matches or corresponds to the query variables. For example, the result set may specify a quantity of network addresses that attempt to access a user account within a time interval, a quantity of passwords being tried on the user account within the time interval, a quantity of failed authentication requests within the time interval, etc. So a query configured with one or more query variables is run on the logged authentication data to determine if a pattern of the logged authentication data corresponds to the query variables.

At 306, the identified pattern of the logged authentication data as indicated in the generated result set is analyzed to determine if one or more authentication requests indicate an attack characterized by a predefined pattern. For example, the authentication data associated with the authentication requests may be compared with the predefined pattern to determine if the authentication data matches the predefined pattern. If it is determined that the authentication requests indicate the characterized attack, an alert is generated at 308 to inform an operator that the attack may have occurred. As such, the operator proceeds to implement a remedial or mitigation action. At 310, a report is generated to summarize the logged authentication data and to provide specific information regarding the detected attack.

Exemplary Attack Remediation Method

Figure 4:
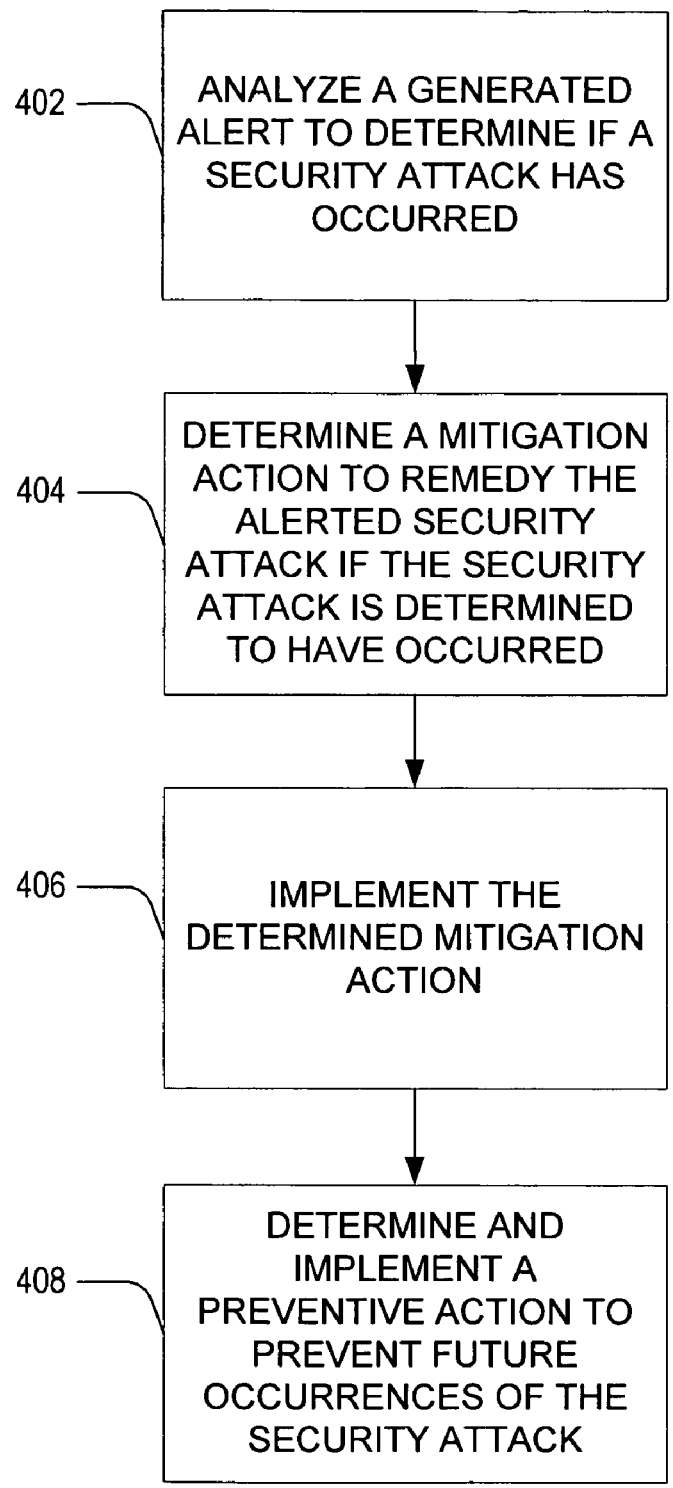
FIG. 4 is an exemplary flow diagram illustrating process flow according to one embodiment of the invention for remedying an attack on an authentication service.

FIG. 4 generally illustrates one exemplary method for remedying an attack on an authentication service according to one embodiment of the invention. At 402, an alert generated, for example, by system 200 is analyzed to determine if an attack has occurred. At 404, if it is determined that an attack has occurred, a mitigation action to remedy the alerted attack is determined. For example, the mitigation action includes locking a user account associated with a failed authentication request, blocking a network address from which the failed authentication request is communicated, etc. At 406, the determined mitigation action is implemented on the authentication service. And at 408, a preventive action to prevent future occurrences of the attack is determined and implemented. For example, the preventive action includes implementing one or more HIPs on the authentication service, prompting a user to change his or her password, limiting a quantity of allowed unsuccessful authentication requests coming from a network address to a predetermined quantity within a predefined time interval, etc.

Exemplary Computer-Readable Medium

Figure 5:
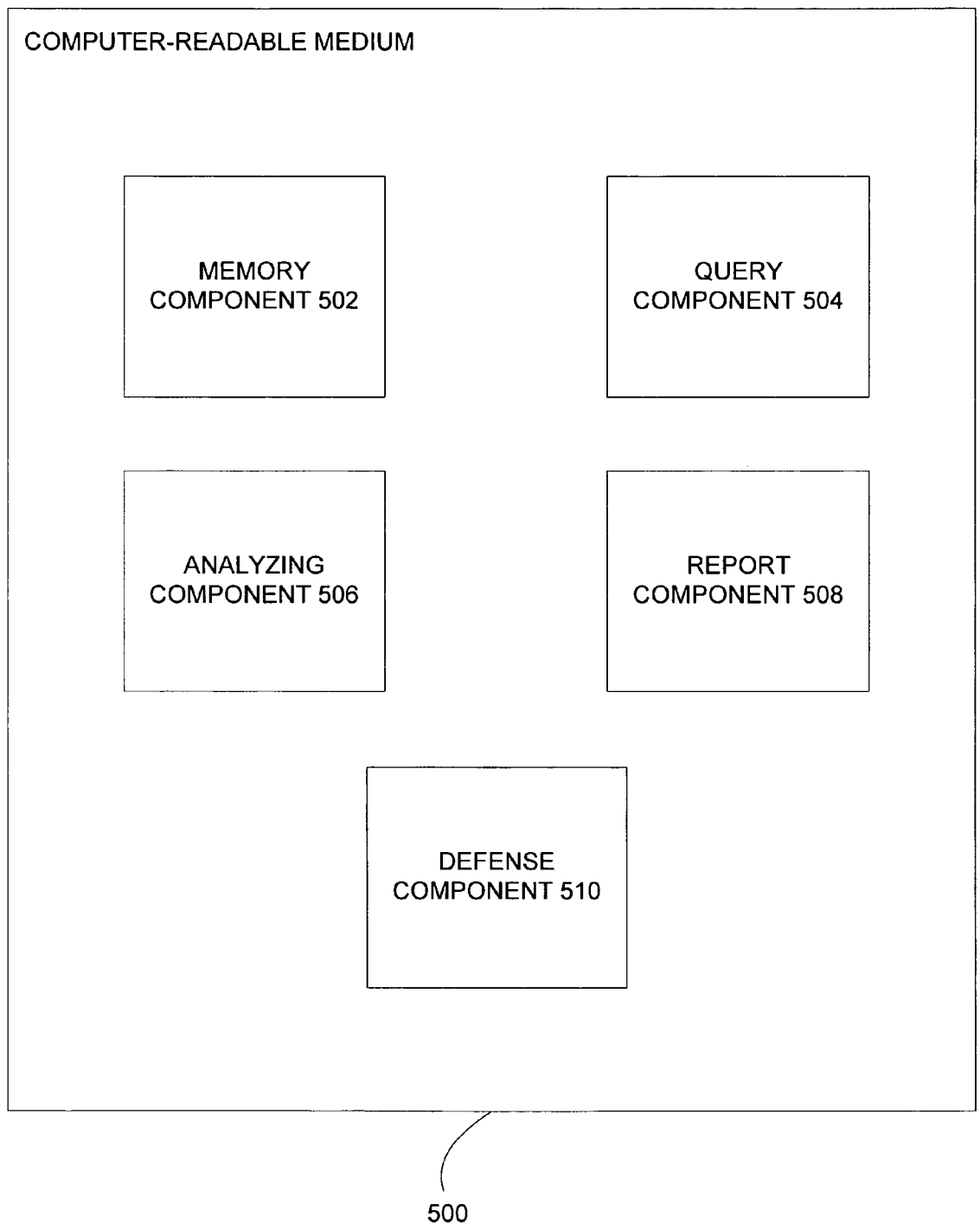
FIG. 5 is a block diagram illustrating an exemplary computer-readable medium according to one embodiment of the invention.

FIG. 5 is a block diagram illustrating an exemplary computer-readable medium 500 according to one embodiment of the invention. As shown, the computer-readable medium 500 includes a memory component 502, a query component 504, an analyzing component 506, a report component 508, and a defense component 510. However, it is contemplated that computer-readable medium 500 may be any quantity of computer readable media and may comprise various combinations of components and functionalities associated with each component. The memory component 502 is adapted to store authentication data relating to one or more authentication requests communicated to an authentication service. The query component 504 is adapted to search the stored authentication data to identify authentication requests as a function of at least one query variable. The analyzing component 506 is adapted to compare the identified authentication requests with a predefined pattern that characterizes an attack on the authentication service. Analyzing component 506 is further adapted to determine that the characterized attack has occurred if the identified authentication requests match the predefined pattern. The report component 508 is adapted to generate a report if it is determined that the characterized attack has occurred. The report provides specific information regarding the attack. The defense component 510 is adapted to remedy the characterized attack it is determined that the attack has occurred.

Exemplary Operating Environment

Figure 6:
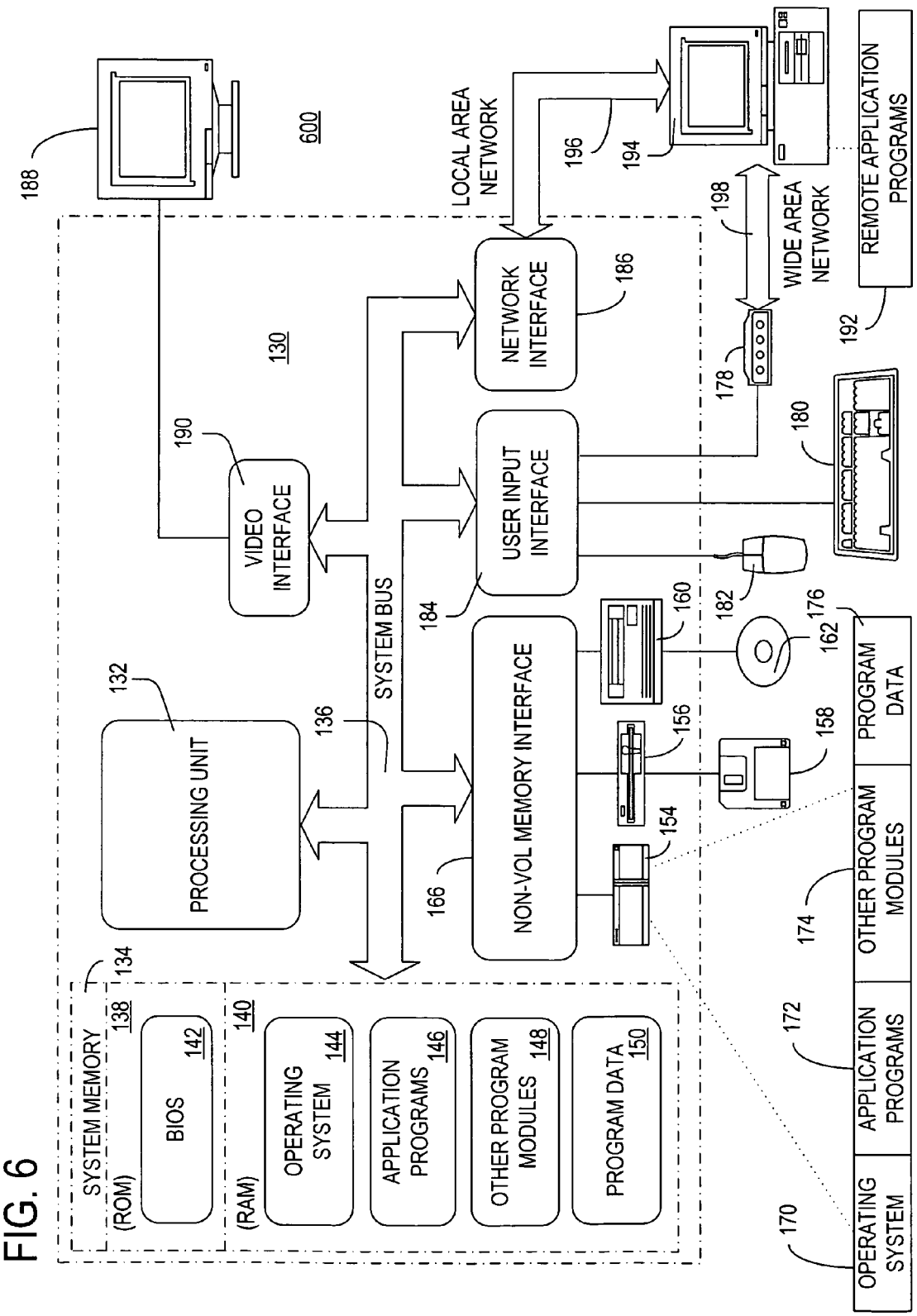
FIG. 6 is a block diagram illustrating an exemplary embodiment of a suitable computing system environment in which one embodiment of the invention may be implemented.

FIG. 6 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), including the basic routines that help to transfer information between elements within computer 130, such as during start-up, is typically stored in ROM 138. RAM 140 typically includes data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media include instructions or programs for implementing the steps described below in conjunction with a microprocessor or other data processor. One embodiment of the invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, one embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those described herein to detect an attack on an authentication service. Computer-executable instructions are adapted to store data relating to a plurality of requests communicated to an authentication service from a plurality of user agents via a data communication network. Computer-executable instructions are adapted to search the stored data based on a query variable to identify at least one of the plurality of requests communicated from at least one of the plurality of the user agents. Computer-executable instructions are further adapted to comparing the stored data associated with each of the identified requests with a predefined pattern characterizing an attack to determine when the identified request indicates the characterized attack on the authentication service.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

Appendix A

The following provides specific examples of user scenarios according to embodiments of the invention.

Noticing an Unusual Activity

There is a surge of activities in authentication requests communicated to a login server. Hundreds of users are being locked out of their user accounts because of multiple login failures. This issue has been escalated. Accordingly, operations run a query on authentication data collected and stored previously, sort out the authentication data, and determine a list of network addresses that are causing the login failures. And a decision is made to block authentication requests communicated from these network addresses. As a result, the attack is effectively brought down.

Determining Statistical Data on Attacks

It is desirable to produce a security audit document related to an authentication service. This document discloses a summary of the intrusion attempts targeted against the authentication service over the past year. Operations detect intrusion activities and log relevant data into a database. The logged data is analyzed and reported using a data-modeling tool. Based on this data, a report is generated to determine the extent to which security of the authentication service has improved over time. Also, time dependent reports show implications of security for a particular version of the authentication service, which may be attributed to the launch of some defensive mechanisms such as HIP.

Informing an Unusual Activity

With some defensive mechanisms implemented on an authentication service, attackers are trying to engage in a variety of attacks against the authentication service. For example, using a single password and multiple network sources, these attackers may attempt to attack a large quantity of weak user accounts. With an attack detection mechanism, a suspicious activity is noted in a report. This report indicates that a single password seems to originate from a set of network addresses. Also from the report, it seems that the attack is complicated, as the quantity of network addresses from which the attack is initiated and the quantity of attacked user accounts are high. Moreover, the network addresses with the highest activities are determined not to be proxies. And there is not a successful authentication request from these network addresses. Accordingly, a mitigation action is initiated. This mitigation action repels the attack, and compromised user accounts are noted in the report. Users of these compromised user accounts are then prompted to change their passwords.

What is claimed is:

1. A method of detecting an attack on an authentication service, said method comprising:
    storing data relating to a plurality of authentication requests communicated to an authentication service from a plurality of user agents via a data communication network, said requests each including a login identifier, a network address from which the request was communicated, and a password, and wherein storing the data relating to the requests comprises storing the login identifier and network address and storing the password of each of the requests in a database of the authentication service only if the request is unsuccessful;
    searching the stored data based on a query variable to identify a plurality of the requests communicated from at least one of the plurality of the user agents,
    comparing the stored data associated with the identified requests with a predefined pattern characterizing an attack based on the stored data of the identified requests to determine when the identified requests indicate the characterized attack on the authentication service; and
    detecting the attack in response to determining that the identified requests indicate the characterized attack.

2. The method of claim 1, wherein said storing the data relating to the plurality of the requests comprises storing one or more of the following:
    a credential type of the one of the plurality of the requests; a user account associated with the one of the plurality of the requests; a status of the one of the plurality of the requests; a time stamp indicating a date and time of the one of the plurality of the requests; a type of interface from which the one of the plurality of the requests is communicated; and the user agent from which the one of the plurality of the requests is communicated.

3. The method of claim 2, wherein said status of the one of the plurality of the requests comprises one or more of the following: the one of the plurality of the requests is successful; the one of the plurality of the requests is unsuccessful; and the user account associated with the one of the plurality of the requests has been locked.

4. The method of claim 1, wherein said comparing the stored data associated with each of the identified requests with the predefined pattern comprises comparing the stored data with a pattern characterized by one or more of the following: using a single password to unsuccessfully attempt at least a predetermined quantity of requests on multiple user accounts within a predefined time interval; using the single password to unsuccessfully attempt at least the predetermined quantity of the requests from a single network address on the multiple user accounts within the predefined time interval; and unsuccessfully attempting at least the predetermined quantity of the requests from the single network address within the predefined time interval.

5. The method of claim 1, wherein said comparing the stored data associated with each of the identified requests with the predefined pattern comprises comparing the stored data with a pattern characterized by one or more of the following: using multiple passwords to unsuccessfully attempt at least a predetermined quantity of requests on a single user account within a predefined time interval; using the multiple passwords to unsuccessfully attempt at least the predetermined quantity of the requests from a single network address on the single user account within the predefined time interval; and unsuccessfully attempting at least the predetermined quantity of the requests on the single user account within the predefined time interval.

6. The method of claim 1, wherein said comparing the stored data associated with each of the identified requests with the predefined pattern comprises comparing the stored data with a pattern characterized by one or more of the following: a single password to unsuccessfully attempt at least a predetermined quantity of requests from multiple network addresses on a single user account within a predefined time interval; and unsuccessfully attempting at least the predetermined quantity of the requests from the multiple network addresses on the single user account.

7. The method of claim 1, further comprising generating a report in response to detecting the attack, said report providing information regarding the attack for use in defending against the attack.

8. The method of claim 1, further comprising remedying the attack in response to detecting the attack.

9. The method of claim 1, wherein said remedying the attack comprises performing one or more of the following: locking a user account associated with one of the plurality of the requests; blocking a network address from which the one of the plurality of the requests is communicated; implementing a human interaction proof on the authentication service; prompting a user to change a password associated with the user account; and limiting a quantity of allowed unsuccessful requests to a predetermined quantity within a predefined time interval for the network address from which the one of the plurality of the requests is communicated.

10. The method of claim 1, wherein the plurality of the requests comprises one or more of the following types of requests: authentication, registration, and password-reset; wherein one of the plurality of the requests is communicated via a human interaction proof; and wherein said storing the data relating to the plurality of the requests comprises storing one or more of the following: a network address from which the one of the plurality of the requests is communicated, a process where the human interaction proof is implemented, a time stamp indicating a date and time of the one of the plurality of the requests, and the user agent from which the one of the plurality of the requests is communicated.

11. The method of claim 10, wherein said comparing the stored data associated with each of the identified requests with the predefined pattern comprises comparing the stored data with a pattern characterized by one or more of the following: using multiple test strings to unsuccessfully attempt at least a predetermined quantity of requests on a single human interaction proof string within a predefined time interval; and using a single test string to unsuccessfully attempt at least the predetermined quantity of the requests on multiple human interaction proof strings within the predefined time interval.

12. The method of claim 1, wherein said comparing the stored data associated with each of the identified requests with a predefined pattern comprises:
    comparing historical data relating to the authentication service with the stored data, and
        in response to said comparing, determining if the stored data deviates from the historical data to determine if the attack on the authentication service has occurred.

13. The method of claim 1, wherein said searching the stored data to identify a plurality of the requests comprises searching the stored data to generate a result set based on one or more of the following query variables: a network address that communicates a request, a quantity of user accounts for which access has been attempted, a password associated with a failed request, a quantity of failed requests for one or more user accounts, a quantity of requests for one or more user accounts, and a time interval during which one or more requests are communicated; wherein the result set identifies the stored data relating to one or more requests that correspond to the query variables.

14. The method of claim 1, wherein one or more computer-readable storage media have computer-executable instructions for performing the method recited in claim 1.

15. A system of detecting an attack on an authentication service, said system comprising:
- a first memory area to store data relating to a plurality of authentication requests communicated to an authentication service from a plurality of user agents via a data communication network, said data being stored in the first memory area as a log of the authentication service, wherein each of the requests communicated to the authentication service includes a login identifier, a network address from which the request was communicated, and a password and wherein the stored data contains the login identifier and the network address and contains the password of each of the requests only if the request is unsuccessful, and wherein said first memory area is a database of the authentication service;
- a second memory area to store a predefined pattern of a plurality of requests, said predefined pattern characterizing an attack on the authentication service; and
- a processor configured to execute computer-executable instructions to:
- search the stored data as a function of a query variable to identify a plurality of the requests communicated from at least one of the plurality of the user agents,
- compare the stored data associated with each of the identified requests with the predefined pattern,
- determine whether the identified requests indicate the attack characterized by the predefined pattern, and
- detect the attack in response to determining that the identified requests indicate the attack characterized by the predefined pattern.

16. The system of claim 15, wherein the stored data comprises one or more of the following:
- a credential type of the one of the plurality of the requests; a user account associated with the one of the plurality of the requests; a failed password associated with the one of the plurality of the requests; a status of the one of the plurality of the requests; a time stamp indicating a date and time of the one of the plurality of the requests; a type of interface from which the one of the plurality of the requests is communicated; and the user agent from which the one of the plurality of the requests is communicated.

17. The system of claim 15, wherein said predefined pattern is characterized by one or more of the following: using a single password to unsuccessfully attempt a quantity of requests on multiple user accounts within a predefined time interval; using the single password to unsuccessfully attempt the quantity of the requests from a single network address on the multiple user accounts within the predefined time interval; and unsuccessfully attempting the quantity of the requests from the single network address within the predefined time interval.

18. The system of claim 15, wherein said predefined pattern is characterized by one or more of the following: using multiple passwords to unsuccessfully attempt a quantity of requests on a single user account within a predefined time interval; using the multiple passwords to unsuccessfully attempt the quantity of the requests from a single network address on the single user account within the predefined time interval; unsuccessfully attempting the quantity of the requests on the single user account within the predefined time interval; using a single password to unsuccessfully attempt a quantity of requests from multiple network addresses on a single user account within a predefined time interval; and using the multiple network addresses to unsuccessfully attempt the quantity of the requests on the single user account.

19. The system of claim 15, wherein the processor is configured to search the stored data to identify a plurality of the requests by generating a result set based on one or more of the following query variables: a network address that communicates a request, a quantity of user accounts for which access has been attempted, a password associated with a failed request, a quantity of failed requests for one or more user accounts, a quantity of requests for one or more user accounts, and a time interval during which one or more requests are communicated; wherein the result set identifies the stored data relating to one or more requests that correspond to the query variables.

20. The system of claim 15, wherein the processor is further configured to generate a report in response to detecting the attack, said report providing information regarding the characterized attack for use in defending against the attack.

21. The system of claim 15, wherein the processor is further configured to remedy the characterized attack in response to detecting the attack.

22. The system of claim 15, wherein the plurality of the requests comprises one or more of the following types of requests: authentication, registration, and password-reset; wherein one of the plurality of the requests is communicated via a human interaction proof; and wherein the stored data comprises one or more of the following: a network address from which the one of the plurality of the requests is communicated, a process where the human interaction proof is implemented, a time stamp indicating a date and time of the one of the plurality of the requests, and the user agent from which the one of the plurality of the requests is communicated.

23. The system of claim 22, wherein said predefined pattern is characterized by one or more of the following: using multiple test strings to unsuccessfully attempt a quantity of requests on a single human interaction proof string within a predefined time interval; and using a single test string to attempt unsuccessfully the quantity of the requests on multiple human interaction proof strings within the predefined time interval.

24. A user authentication system, said system receiving a plurality of authentication requests communicated from a plurality of user agents, each of said requests including a login identifier, a network address from which the request was communicated, and a password associated therewith, said system comprising:
- a first memory area to store data relating to a plurality of unsuccessful requests communicated from the plurality of user agents, wherein the stored data includes the login identifier and the network address and includes the password of each of the unsuccessful requests communicated from the plurality of user agents and does not include the password of any successful requests, wherein the first memory area is a database of the user authentication service;
- a second memory area to store a predefined pattern of a plurality of requests, said predefined pattern characterizing an attack based on the stored data of each of the plurality of requests; and a processor configured to execute computer-executable instructions to:
    search the stored data based on a query variable to generate a result set that identifies a plurality of the requests communicated from at least one of the plurality of the user agents,
    compare each of the identified requests with the predefined pattern to determine if the characterized attack has occurred, and
    detect the attack in response to determining that the characterized attack has occurred.

25. The system of claim 24, wherein the stored data comprises one or more of the following: a credential type of the one of the plurality of the requests; a user account associated with the one of the plurality of the requests; a failed password associated with the one of the plurality of the requests; a status of the one of the plurality of the requests; a time stamp indicating a date and time of the one of the plurality of the requests; a type of interface from which the one of the plurality of the requests is communicated; and a user agent from which the one of the plurality of the requests is communicated.

26. The system of claim 24, wherein said predefined pattern is characterized by one or more of the following: using a single password to unsuccessfully attempt at least a predetermined quantity of requests on multiple user accounts within a predefined time interval; using the single password to unsuccessfully attempt at least the predetermined quantity of the requests from a single network address on the multiple user accounts within the predefined time interval; and unsuccessfully attempting at least the predetermined quantity of the requests from the single network address within the predefined time interval.

27. The system of claim 24, wherein the processor is further configured to generate a report in response to detecting the attack, said report providing information regarding the characterized attack for use in defending against the attack.

28. The system of claim 24, wherein the processor is further configured to remedy the characterized attack if the characterized attack is determined to have occurred.

29. The system of claim 24, wherein the plurality of the requests comprises one or more of the following types of requests: authentication, registration, and password-reset; wherein one of the plurality of the requests is communicated via a human interaction proof; and wherein said predefined pattern is characterized by one or more of the following: using multiple test strings to unsuccessfully attempt at least a predetermined quantity of requests on a single human interaction proof string within a predefined time interval, and using a single test string to unsuccessfully attempt at least the predetermined quantity of the requests on multiple human interaction proof strings within the predefined time interval.

30. The system of claim 24, further comprising means for determining if the stored data associated with one or more of the plurality of the requests matches the predefined pattern.

31. One or more computer-readable storage media having computer-executable components for detecting an attack on an authentication service, said authentication service receiving a plurality of authentication requests communicated from a plurality of user agents via a data communication network, each of said requests including a login identifier, a network address from which the request was communicated, and a password associated therewith, said computer-readable media comprising:
    a memory component to store data relating to a plurality of unsuccessful requests communicated to the authentication service from the plurality of user agents, wherein the stored data includes the login identifier and the network address, and includes the password of each of the unsuccessful requests communicated to the authentication service and does not include the password of any successful requests, wherein said memory component comprises a database of the authentication service,
    a query component to search the stored data as a function of a query variable to identify a plurality of the requests communicated from at least one of the plurality of the user agents, and
    an analyzing component to compare the stored data associated with each of the identified requests with a predefined pattern characterizing an attack based on the stored data of each of the identified requests to determine when the identified request indicates the characterized attack on the authentication service and to detect the attack on the authentication service in response to determining that the identified request indicates the characterized attack.

32. The computer-readable storage media of claim 31, wherein the stored data comprises one or more of the following information: a credential type of the one of the plurality of the requests; a user account associated with the one of the plurality of the requests; a failed password associated with the one of the plurality of the requests; a status of the one of the plurality of the requests; a time stamp indicating a date and time of the one of the plurality of the requests; a type of interface from which the one of the plurality of the requests is communicated; and the user agent from which the one of the plurality of the requests is communicated.

33. The computer-readable storage media of claim 31, wherein said predefined pattern is characterized by one or more of the following: using a single password to unsuccessfully attempt a quantity of requests on multiple user accounts within a predefined time interval; using the single password to unsuccessfully attempt the quantity of the requests from a single network address on the multiple user accounts within the predefined time interval; and unsuccessfully attempting the quantity of the requests from the single network address within the predefined time interval.

34. The computer-readable storage media of claim 31, further comprising a report component to generate a report in response to detecting the attack, said report providing information regarding the attack for use in defending against the attack.

35. The computer-readable storage media of claim 31, further comprising a defense component to remedy the characterized attack in response to detecting the attack.

36. The computer-readable storage media of claim 35, wherein said defense component is adapted to remedy the characterized attack by performing one or more of the following in response to detecting the attack: locking a user account associated with one of the plurality of the requests; blocking a network address from which the one of the plurality of the requests is communicated; implementing a human interaction proof on the authentication service; prompting a user to change a password associated with the user account; and limiting a quantity of allowed unsuccessful requests to a predetermined quantity within a predefined time interval for the network address from which the one of the plurality of the requests is communicated.

37. The computer-readable storage media of claim 31, wherein the plurality of the requests comprises one or more of the following types of requests: authentication, registration, and password-reset; wherein one of the plurality of the requests is communicated via a human interaction proof; and wherein said predefined pattern is characterized by one or more of the following: using multiple test strings to unsuccessfully attempt a quantity of requests on a single human interaction proof string within a predefined time interval, and using a single test string to unsuccessfully attempt the quantity of the requests on multiple human interaction proof strings within the predefined time interval.

38. The computer-readable storage media of claim 31, wherein the query component is adapted to search the stored data to identify a plurality of the requests by generating a result set based on one or more of the following query variables: a network address that communicates a request, a quantity of user accounts for which access has been attempted, a password associated with a failed request, a quantity of failed requests for one or more user accounts, a quantity of requests for one or more user accounts, and a time interval during which one or more requests are communicated; and wherein the result set identifies the stored data relating to one or more requests that match the query variables.

* * * * *